United States Patent [19]

Pago et al.

[11] Patent Number: 5,513,902

[45] Date of Patent: May 7, 1996

[54] DRIVING SYSTEM FOR DRIVING FLEXIBLE ELONGATE MEMBERS, SUCH AS CHAINS OR SCRAPER-CHAIN ASSEMBLIES, IN MINERAL MINING INSTALLATIONS AND METHOD OF OPERATING

[75] Inventors: Bernd-Christian Pago, Olfen; Bernhard Voss, Lunen; Martin Eickhoff, Dortmund; Jens Titschert, Lunen; Arno Breimhost, Hagen, all of Germany

[73] Assignees: Westfalia Becorit Industrietechnik GMBH, Germany; Reliance Electric Industrial Company

[21] Appl. No.: 243,999

[22] Filed: May 18, 1994

[30] Foreign Application Priority Data

May 19, 1993 [DE] Germany .......................... 43 16 798.5

[51] Int. Cl.⁶ ........................... E21C 29/16; B60K 41/02

[52] U.S. Cl. ........................ 299/1.6; 299/34.07; 475/317; 477/4

[58] Field of Search ................... 299/1.6, 34.07; 477/4, 7; 475/317

[56] References Cited

U.S. PATENT DOCUMENTS

| | | | |
|---|---|---|---|
| 4,614,134 | 9/1986 | Bohle | 475/125 |
| 4,667,790 | 5/1987 | Bohle | 192/56 F |
| 4,682,678 | 7/1987 | Kussel et al. | 192/56 F |
| 4,939,949 | 7/1990 | Langenberg | 74/475 |
| 5,055,092 | 10/1991 | Langenberg et al. | 475/2 |

FOREIGN PATENT DOCUMENTS

| | | | |
|---|---|---|---|
| 2824271 | 12/1978 | Germany | 299/1.6 |
| 3130050 | 4/1983 | Germany | 299/1.6 |
| 3331039 | 3/1985 | Germany | 475/317 |
| 3722612 | 1/1989 | Germany . | |
| 3733336 | 4/1989 | Germany . | |
| 3741762 | 5/1989 | Germany . | |
| 72501 | 3/1955 | United Kingdom | 299/34 |
| 2088442 | 6/1982 | United Kingdom | 299/1.6 |

*Primary Examiner*—David J. Bagnell
*Attorney, Agent, or Firm*—Samuels, Gauthier, Stevens & Reppert

[57] ABSTRACT

A drive system for driving a flexible elongate member such as a haulage chain for a mineral mining machine or scraper-chain assembly of a scraper-chain conveyor of a mineral mining installation employs main and auxiliary drive units each equipped with an electric asynchronous motor drivably connected through a gearing assembly to a sprocket around which the chain or scraper-chain assembly is entrained. The gearing assemblies each employ a multi-disc clutch which is subjected to variable loading pressure and slippage by means of a valve actuated by electrical signals provided by an electronic controller. Each clutch acts through gears on a ring gear of planetary gearing and the ring gear wheel is subjected to a controlled supportive torque. The electronic controller is designed to actuate the associated valves to adjust the clutches to balance loading on the motors of the units. During a start-up phase the controller functions to ensure the force transmitted to the chain or scraper-chain assembly slowly and progressively increases and sudden loading is avoided. In the event of overloading the controller causes the valves to actuate the clutches rapidly to allow the ring gears of the planetary gearings to rotate freely to disconnect the drive.

23 Claims, 2 Drawing Sheets

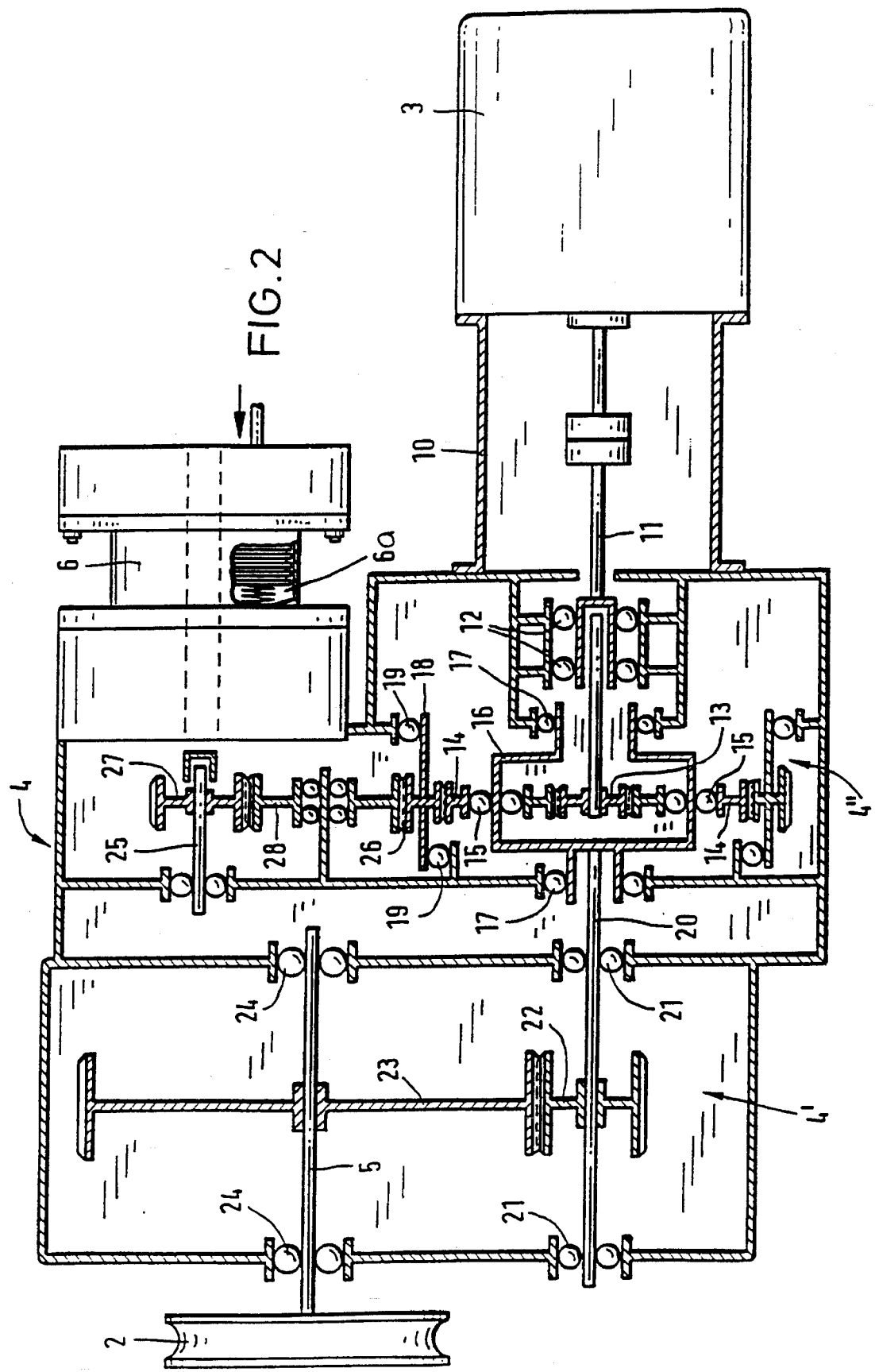

DRIVING SYSTEM FOR DRIVING FLEXIBLE ELONGATE MEMBERS, SUCH AS CHAINS OR SCRAPER-CHAIN ASSEMBLIES, IN MINERAL MINING INSTALLATIONS AND METHOD OF OPERATING

FIELD OF THE INVENTION

The present invention relates to a drive system or arrangement for propelling a flexible elongate member, such as a chain or cable. More particularly, the invention is concerned with a drive system for driving a haulage chain for a mineral mining machine, such as a plough, or for driving a scraper-chain assembly of a scraper chain conveyor of a mining installation.

BACKGROUND OF THE INVENTION

Nowadays, scraper-chain conveyors and chain driven machinery for mineral, e.g. coal, mining installations require powerful drive systems equipped with overload protection mechanisms usually hydraulically actuated multi-disc clutches. Overload protective gearing is known and has been tried and test in mining practice. Such known gearing has an integrated multi-disc friction clutch driven by compressed air via an electro-hydraulic quick-acting valve which operates in the event of overload. Overloading is detected with measured value transmitters which either measure the torque on the gearing output shaft or measure the speed differences in the motor or in the gearing by means of proximity switches. The prevailing chain drive force is thus continuously monitored during operation.

Known overload protective gearing consists either of two-stage spur gearing, two-stage planetary gearing or of gearing having one planetary stage and one spur wheel gear stage. In gearing with a planetary stage, the safety clutch can be allocated to one of the normally operating planetary gear components usually the hollow toothed wheel or ring gear on of which a supporting moment is adjusted by the clutch in relation to the stationary housing.

Examples of known gearing and equipment for drive systems with overload protection are described in U.S. Pat. Nos. 4682678, 4614134 and 4667790 and in DE 3722612.

It is known also in chain drive systems to have separate motors and overload protective gearing forming main and auxiliary drive stations or units and to use the overload protective gearing to compensate for load variations in order to adapt the motor speeds and therefore the motor ratings on the main and auxiliary drive units, see for example, DE-3733336, DE-37140762 and U.S. Pat. Nos. 4939949 and 5055092. One known load compensating gearing uses a supportive motor which is allocated to the ring gear or the planet carrier of a planetary gearing stage. It is also already known in the case of load compensating gearing to allocate to the safety clutch controller a slip monitoring device and a speed monitoring device of which the measured values are evaluated by the controller for switching the safety clutch in the case of chain blocking.

In all known drive systems for powerful haulage chains or conveyor drives considerable load peaks accompanied by significant stresses arise when starting under load. Hydraulic couplings can be used as a starting aid in order to achieve smooth starting of the conveyor or the haulage chain but the use of hydraulic couplings has not been a practical solution.

SUMMARY OF THE INVENTION

An object of the invention is to provide an improved drive system or arrangement of the type mentioned at the outset equipped with overload protective gearing without excessive additional production costs such that load-free motor acceleration and smooth starting of the conveyor or of the haulage chain can be achieved reliably.

In one aspect the invention provides a drive system for driving a flexible elongate member and comprising:

a coupler around which the elongate member is drivably entrained;

an electric asynchronous motor;

a gearing assembly drivably interposed between the motor and the coupler;

a multi-disc clutch operably associated with the gearing assembly to vary supportive torque exerted on a component of the gearing assembly to control drive torque transmitted through the gearing assembly;

an electrically-actuated valve operably associated with the clutch to provide a variable loading pressure to the discs thereof to control slippage and cause the variation in the supportive torque;

an electronic controller for providing electrical control signals to the valve;

sensor means for sensing operating parameters of the drive system and for providing measurement data to the controller and means within the electronic controller for providing sequential electrical control signals to the valve during starting of the drive system to cause the valve initially to operate the clutch to disconnect the drive through the gearing assembly to allow the motor to accelerate under load-free conditions and thereafter in a start-up phase to cause the valve to operate the clutch to vary progressively the slippage of the discs thereby to and slowly increase the drive torque transmitted through gearing assembly progressively.

In another aspect the invention provides a drive system for driving a haulage chain of a mining machine or a scraper-chain assembly of a conveyor said system being composed of a pair of spaced apart drive units, each unit comprising a coupler around which the chain or the scraper-chain assembly is drivably entrained: an electric asynchronous motor;

a gearing assembly drivably interposed between the motor and the coupler;

a multi-disc clutch operably associated with the gearing assembly to vary supportive torque exerted on a component of the gearing assembly to control drive torque transmitted through the gearing assembly and an electrically-actuated valve operably associated with the clutch to provide a variable loading pressure to the discs thereof to control slippage and cause the variation in the supportive torque. The drive system further comprises at least one electronic controller for providing electrical control signals to the valves and sensor means for sensing operating parameters of the drive system including overloading and for providing measurement data to the controller. In such a system the invention provides an improved method of operating the controller to control the drive torque with the clutches and the valves to ensure a smooth start-up, to balance dynamic loading between the drive units and to disconnect the drive through the gearing assemblies in the event of a sensed overload wherein during the start-up phase control signals are provided to the valves to operate the clutches to disconnect the drive initially through the associated gearing assemblies to allow the motors to accelerate under load free conditions and thereafter to increase the drive torque transmitted through the gearing assemblies progressively.

According to the invention, and as appears hereinafter, the object is achieved in that the electronic controller is designed to provide electrically controlled or regulated loading or closing adjustment of the or each multi-disc clutch for the motor acceleration phase and the starting phase of the drive to avoid sudden loading peaks and ensure a smooth start. The multi-disc clutch is itself controlled dynamically via the associated valve, e.g. an electric solenoid valve, by variation of its hydraulic or pneumatic induced loading pressure and hence its slippage after the start-up phase and during normal running. The sensor means may include means for sensing overloading and the controller then includes means for providing a control signal to the valve or valves to operate the clutch or clutches and disconnect the drive through the gearing assembly on the occurrence of a sensed overload.

According to the invention, the same multi-disc clutch can be thus be assigned, in addition to its known function as a safety clutch, the further function of load-free motor acceleration and smooth starting of the face conveyor or of the haulage chain wherein this second function is carried out automatically during each motor acceleration and staring process in operations controlled by the controller and by electronic devices of the controller.

According to the invention, the start-up phase control is achieved in that the multi-disc clutch is initially pressure-free, that is open, at the beginning of motor starting. After load-free acceleration of the asynchronous motor, the multi-disc clutch is loaded slowing and increasingly strongly in the closing direction by the hydraulic or pneumatic pressure medium adjustment. The drive introduced into the chain or scraper-chain thus increases slowly until, finally, at the end of the start-up phase, the conveyor or the chain has accelerated to the operating speed. After a smooth start of the conveyor or of the machine propelled by the haulage chain the controller operates in the conventional manner in the sense of overload protection. As known, this can be carried out by sensing torque measurement on a gear shaft or by speed difference measurement by proximity switches on the motor or gearing.

As mentioned, in the case of the driving arrangement according to the invention, the smooth start is brought about during the start-up phase by a slow, continuous increase in the loading pressure of the multi-disc clutch or by an increase in the loading pressure in successive incremental loading stages so that the loading pressure on the multi-disc clutch and therefore its slippage and resultant support torque increases more or less continuously beyond the start-up phase until the loading pressure required for normal running is finally achieved at the end of the start-up phase. A particularly simple arrangement is achieved if the multi-disc clutch is loaded in the start-up phase by switching of the electric solenoid valve in the sense of a continuous or intermittent increase in the loading pressure i.e. the disc contact pressure. During each switching process of the solenoid valve, a cylinder chamber of the clutch is momentarily connected to the hydraulic or pneumatic pressure supply and the pressure in the cylinder chamber of the clutch correspondingly increase until the operating pressure predetermined in the electronic controller is finally achieved. The multi-disc clutch is preferably designed such that it is closed hydraulically or pneumatically and opened by spring force. However, the multi-disc clutch can instead be closed by spring force and opened by hydraulic or pneumatic pressure loading against the spring force. To initiate the start-up phase, the sensor means of the controller can detect the operating state of the asynchronous motor, for example its speed or current or power consumption, and supplies the measurement data signals for initiating controlled or regulated loading pressure adjustment.

Conveniently the gearing assembly comprises at least one planetary gearing stage with a ring gear or planet wheel carrier acting as the component on which the supportive torque is exerted.

In a drive system for mining there can be two drive units each spaced apart along the elongate member. Each drive unit comprises the combination of the coupler, the motor the gearing assembly the clutch and the valve and the gearing assemblies are controlled by the controller to regulate the clutches.

Particular advantages arise, if the driving arrangement according to the invention is at the same time designed for load compensating or balancing. In this case, the multi-disc Clutches have the third function of load adaptation of the motors on the main and auxiliary drive units. Therefore, in a preferred design of the driving arrangement according to the invention, the controller brings about load compensation by slip regulation of both the multi-disc clutches so that the gearing associated with the respectively more highly-loaded asynchronous motor, is cause to transmit less drive torque. The drive units for the main drive station and the auxiliary drive station can be identical to one another in design, the two drive units either being allocated a common controller or each its own electronic controller. In the latter case, the two controllers are operably interconnected, e.g via an electric communication line.

The gearing assembly used in the driving arrangement according to the invention can comprise several planetary stages, as known, or can consist of one planetary stage and one spur gear stage. A planetary input differential gear with 1:1 transmission in normal running can be used in conjunction with a spur wheel step-down reduction gear.

The sensor means and the electronic controller can cooperate to perform the known function of overload release of the multi-disc clutch or clutches in the event of a predetermined maximum pulling force or a maximum torque on a gear output shaft, the function of controlled or regulated pressure adjustment of the multi-disc clutch or clutches in the start-up phase, the load balancing compensating function and further a tensioning function. In the latter mode, the elongate member is a haulage chain for a mineral mining machine or a scraper-chain assembly of a scraper-chain conveyor and the sensor means provides a signal representing the power consumption of the motor of one of the units used in a chain tensioning mode. The electronic controller includes means for providing electrical control signals to the valve of the clutch of said one unit to control the drive torque and to bring the haulage chain/scraper chain assembly tension to a desired value.

In a preferred embodiment of the invention, the electronic controller has a computer which controls the valves, processes the measured data (actual values) delivered by sensor means, e.g. the respectively consumed effective power of the motor, the respective clutch slippage and the respective loading pressure, compares the measured data with stored desired values, and evaluates and determines the respectively required clutch loading pressures and adjusts these by emitting the signals to the control valves of the clutches. The electronic computer can perform the calculations on the basis of these measured values and stored values, in accordance with a control algorithm fixed in a computer program. The momentarily required loading or contact pressure for each valve is then adjusted by control of the valve of the clutch with the control signal generated by the controller.

The invention may be understood more readily, and various other aspects and features of the invention may become apparent, from consideration of the following description.

BRIEF DESCRIPTION OF DRAWINGS

An embodiment of the invention will now be described, by way of example only, with reference to the accompanying drawings, wherein:

FIG. 1 is a block schematic representation of a drive system constructed in accordance with the invention and FIG. 2 is a diagrammatic cross-sectional representation of a gearing assembly usable in the drive system depicted in FIG. 1.

DESCRIPTION OF PREFERRED EMBODIMENT

Figure 1:
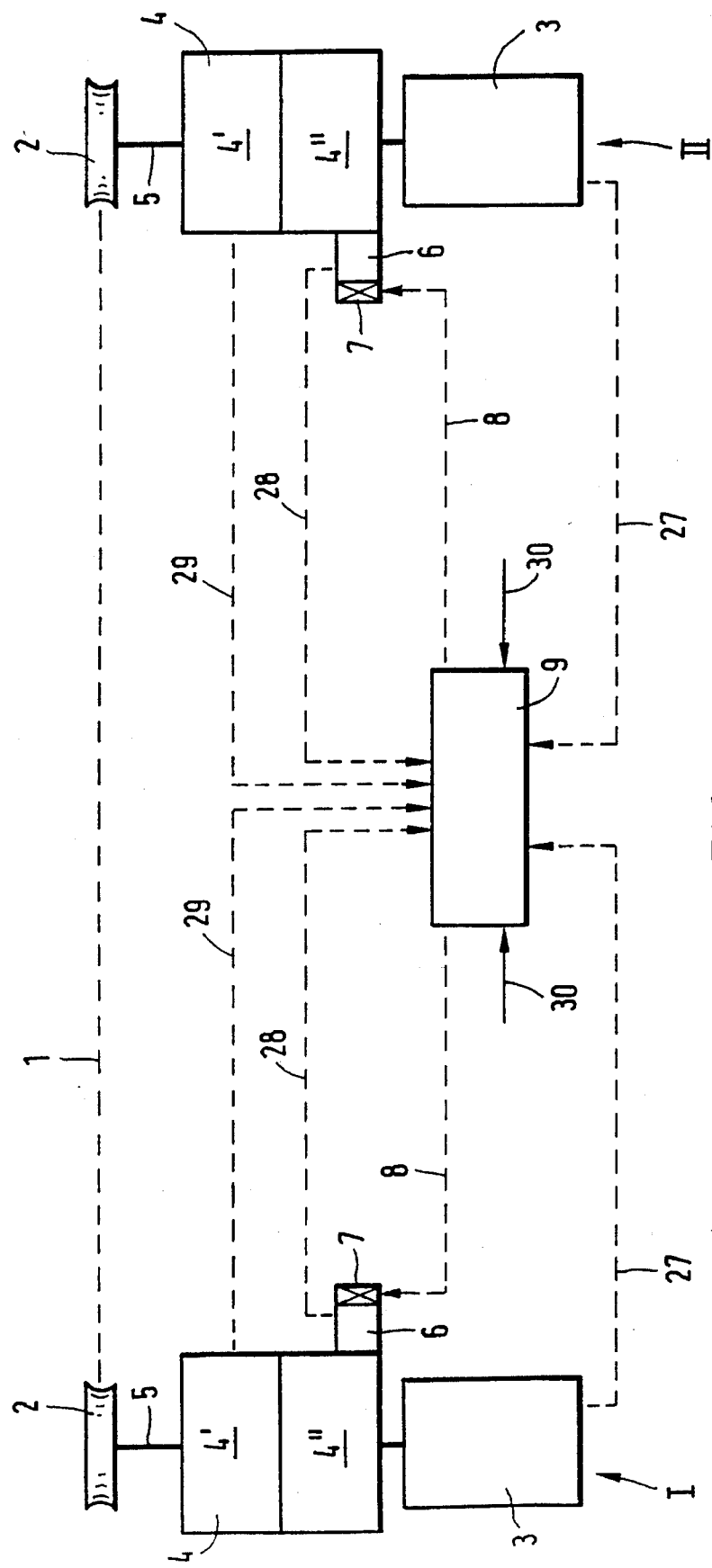

FIG. 1 shows a drive system for driving an endless elongate flexible member 1 entrained around drive couplers 2 spaced apart along the length of the member 1. The drive system is usable, for example, for driving a chain for propelling a mineral mining machine, such as a plough, of a mining installation back and forth along a mineral face. In this case, the member 1 is the chain and the drive couplers 2 are toothed sprocket wheels for driving engagement with the chain 1. The drive system can also be used, for example, to drive a scraper-chain assembly of a scraper-chain conveyor of a mining installation. In this case, the member 1 is the scraper-chain assembly and the couplers 2 are drums with one or more sprocket wheels drivably engageable with the chain or chains of the scraper-chain assembly. In other applications, the member 1 can be a cable and the drive couplers 2 can be pulleys.

The couplers 2 are driven with the aid of first and second drive units I,II spaced apart along the length of the member 1. In the case of the mining installation, one drive unit I would form at least part of the main drive station and the other drive unit II would form at least part an auxiliary drive station. The drive units I,II are identical. Each drive unit I,II is composed of an electric asynchronous motor 3 drivably connected through a gearing assembly 4 to a shaft 5 carrying the associated drive coupler 2. Each gearing assembly 4 has two gear stages denoted 4' and 4". One gear stage 4", which is the input gear stage, is composed of planetary gearing whilst the other gear stage 4', which is the output gear stage, is composed of planetary or spur gearing. The planetary gearing stage 4" of each gearing assembly 4 employs an hydraulically or pneumatically operated multi-disc clutch/ break device 6 which is preferably disposed on or in a common housing for the gearing assembly 4.

Pneumatic or hydraulic pressure fluid used to operate the clutch/break device 6 is controlled with an electromagnetic or solenoid control valve 7 which is designed as a quick acting valve actuated by electrical signals generated by a common electronic controller 9 and conducted to the valve 7 with the aid of a control line 8. Instead of using a common controller 9 to provide signals to the valves 7 of both drive units I, II, it is possible to have one controller 9 for each unit I,II and to inter-connect the controllers 9, e.g. with a communication link, electrical or otherwise.

The clutch/break device 6 serve to control the drive torque transmitted through the gearings assemblies 4. To achieve this, the clutch/break device 6 of each unit I,II acts on the associated planetary gearing stage 4" to alter a supportive torque or moment imparted to a ring gear or to a planet wheel carrier of the gearing 4". With the clutch/break device 6 and its discs in its fully closed state, the ring gear or planet wheel carrier is held stationary relative to the housing of the assembly 4 and maximum drive torque is transmitted. With the clutch/break device 6 and its disc in the open state, the ring gear or planet wheel carrier is released and no drive torque is transmitted.

The drive torque can be adjusted between these extreme states by adjusting the loading pressure on the clutch discs to vary the slippage.

FIG. 2 depicts one of the gearing assemblies 4 in which the output gearing stage 4 is formed as spur gearing. As shown in FIG. 2, the motor 3 is connected with a flanged tubular support 10 to the outside of an external wall of the housing of the assembly 4. The planetary input gearing stage 4" has an input shaft 11 coupled to the output shaft of the motor within the tubular support 10.

The shaft 11 passes freely through the housing wall and is rotatably supported by bearings 12 on an internal structural part of the housing. A sun wheel 13 is carried by the shaft 11 and meshes with surrounding planet wheels 14. The planet wheels 14 are rotatably supported by bearings 15 mounted on a planet wheel carrier 16. The planet wheel carrier 16 is itself rotatably supported by bearings 17 on internal structural parts of the housing. The planet wheels 14 also mesh with internal teeth of a ring gear or toothed hollow wheel 18 which is rotatably supported by bearings 19 on internal structural parts of the housing.

The planet wheel carrier 14 is coupled to a shaft 20 rotatably mounted in bearings 21 on another internal structural part of the housing and on another external wall opposite the wall to which the support 10 is mounted. The shaft 20 forms the input to the spur gearing stage 4' and the shaft 20 carries a smaller spur gear wheel 22 which meshes with a larger spur gear wheel 23 carried by the output shaft 5. The shaft 5 is rotatably supported by bearings 24 mounted on the other external wall and on the other internal structural housing part. The shaft 5 projects out from the other external wall and carries the drive coupler 2. The planetary gearing stage 4 a described and illustrated may have a gearing ratio of 1:1 when the ring gear 18 is stationary whilst the spur gearing 4' has a step down ratio determined by the gear wheels 22,23.

The clutch/break device 6 associated with the gearing assembly 4 has a casing attached to the housing of the gearing assembly 4. The clutch/break device 6 is operably connected to a shaft 25 rotatably supported by a bearing in the housing of the assembly 4. The shaft 25 carries a small gear wheel 27 which acts to transmit supportive torque to the ring gear 18. The gear wheel 27 meshes with a large intermediate gear wheel 28 which is rotatably supported by bearings on an internal structural part of the housing. The gear wheel 28 meshes with external teeth on the ring gear 18 of the planetary gearing 4".

As mentioned, the clutch/break device 6 can be adjusted to vary the support torque applied to the shaft 25 and thence to the compensator gear wheel 27 relative to the housing. In one extreme state when maximum loading pressure is applied to the friction discs of the clutch/break device 6, the clutch/break device 6 holds the shaft 25 and gear wheel 27 fast against rotation. The ring gear 18 of the planetary gearing is now held stationary and effectively locked to the housing so that maximum drive torque can occur. In the other extreme state when no loading pressure is applied to the discs of the clutch/break device 6 the clutch/break device 6 allows the shaft 25 and the gear wheel 27 to rotate freely. In this case the ring gear 18 also rotates freely to prevent transmission of torque through the gearing assembly 4. The clutch is provided with spring means 6a which acts on the discs in opposition to the loading pressure and the loading pressure is effected by hydraulic or pneumatic means. The variable loading pressure applied to the friction discs of the clutch/break device 6 is preferably opposed by spring force to provide a fail safe condition whereby the discs are held open to disconnect the drive. This fail-safe function is useful in protecting against overload and as mentioned previously a rapid switching response of the valve 7 is advantageous. To provide the overload protection, the controller 9 relies upon sensing input signals representing some operating parameter of the drive system and sends appropriate signals to the valves 7 to disable the loading pressure on both clutch/break device 6. By adjusting the dynamic loading pressure on the discs of the clutch/break device 6 of each drive unit I,II between the two extreme limiting states to permit controlled slippage of the discs the drive torque can be controlled progressively.

In the drive system constructed in accordance with the invention, the gearing assemblies 4 of the two drive units I and II form load compensating gearing with which load compensation is brought about, by the clutch/break device 6 and the controller 9, on the two drive units I,II during operation by slip regulation of the clutch/break device 6. Slip regulation of each multi-disc clutch/break device 6 is brought about by controlling the associated solenoid valve 7 with the signals transmitted over the control line 8 from the controller 9 such that the loading pressure applied to the discs of the clutch/break device 6 is varied. Reduction of the loading pressure results in increasing slip torque with the result that drive torque is reduced to adapt the loading. The controller 9 relies upon sensing signal inputs representing operating parameters of the drive system in order to effect this control function. The effective power or current consumed by the asynchronous motors 3 can be measured and used as a manipulatable variable parameter for the slip regulation and load balancing. This load compensating regulation which is brought about during operation by the controller 9 and the valves 7 is not shown in detail.

In accordance with the invention, the operation of the multi-disc clutch/break device 6 is also controlled with respect to the initial start-up and acceleration of the asynchronous motors 3 when they are first switched on to ensure a smooth start-up of the movement of the member 1. For this purpose, the controller 9 and the valves 7 are designed to provide an electrically controlled or regulated loading pressure adjustment of the clutch/break device 6 such that the loading pressure and therefore the disc contact pressure of the clutch/break device 6 and consequently also the slip thereof varies continuously or in incremental stages during the start-up phase. After the start-up phase, the clutch/break device 6 experience maximum loading pressure and the two synchronous motors 3 transmit their maximum driving torque to the drive couplers 2. At the instant of starting the motors 3, the clutch/break device 6 are initially held pressure-free so that no torque is transmitted through the planetary gearing stages 4". The motors 3 can now accelerate to their operating speed without load. After the time needed for motor acceleration the multi-disc clutch/break device 6 are slowly and continuously loaded with a gradually increasing loading pressure by the co-operation of the controller 9 and the valves 7 so that the torque transmitted through the gearing assemblies 4 builds up correspondingly slowly and continuously. Thus in the start-up phase the drive or traction force introduced into the member 1 via the couplers 2 is increased correspondingly slowly.

Referring again to FIG. 1, it is convenient to refer to the common controller 9 but as mentioned previously each driving unit I and II can also be allocated a controller 9 of this type. The controller 9 has an electronic computer for controlling the valves 7 via the control lines 8. The effective electric power consumption or the effective drive current supplied to each of the asynchronous motors 3 is monitored and supplied as actual value to the controller 9 via the electric signal lines 27 indicated in FIG. 1. The controller 9 is also connected to the multi-disc clutch/break device 6 via electric signal lines 28. Sensors with measured value transmitters connected to the multi-disc clutch/break device 6 transmit measured data corresponding to the respective loading pressures on the discs of the clutch/break device 6 back to the controller 9 via the lines 28. The controller 9 is also connected with electric signal lines 29 to the gearing assemblies 4. Signals are supplied from sensors with measured value transmitters which detect the respective gear or clutch slippage back to the controller 9 via the lines 29. The sensors and measured value transmitters for monitoring power or current consumption, slippage and loading pressure can be of a known type.

The electronic computer of the controller 9 processes the measured data supplied as actual values via the signal lines 27,28,29 and by comparing these measured data with pre-set values according to a control algorithm predetermined by a computer program, calculates the respective instantaneously required loading pressure for the multi-disc clutch/break device 6 and then emits the appropriate control signals to the lines 8 for operating the valves 7. Thereby loading pressure applied to the multi-discs clutch/break device 6 is varied accordingly by actual/desired value comparison. As mentioned, this control process is carried out such that the loading pressure on the multi-disc clutch/break device 6 and therefore their frictional moment and support force exerted in the ring gears 18 is increased slowly for the duration of the start-up phase until the asynchronous motors 3 finally transmit their maximum torque via the gearing assemblies 4 to the couplers 2.

As mentioned, the multi-disc clutch/break device 6 are pneumatically or hydraulically relieved, that is vented, during motor acceleration so that the asynchronous motors 3 accelerate to their operating speed without load after first being switched on. At the end of motor acceleration, the above-mentioned start-up phase begins with the described regulation of the loading pressures on the multi-disc clutch/break device 6. Where the member 1 is a chain or scraper-chain assembly a smooth start of the face conveyor of the machine haulage drive results. The end of motor acceleration can be sensed and transmitted to the controller 9 as information via further electric signal lines 30 for initiation of the start-up phase. The loading pressure on the multi-disc clutch/break device 6 can be regulated during the start-up phase by continuous or incremental control of the solenoid valves 7 i.e. by repeated controlled switching of the solenoid valves 7 via the control lines 8. In this way the pressure in cylinder chambers of the multi-disc clutch/break device 6 can be built-up to provide the required smooth start-up.

Not shown in FIG. 1 are the electric signal lines which lead to the electronic controller 9 and supply measured values for overload recognition, for example, the measured values from torque transmitters allocated to the driving units I,II. In the event of an overload for example, in the case of a blockage of the drive system, the controller 9 opens the multi-disc clutch/break device 6 via the control lines 8 and the valves 7 and therefore disconnects the driving connection between asynchronous motors 3 and couplers 2. The asynchronous motors 3 can also be switched off at the same time.

In the described driving system, the electronic controller 9 controls each of the multi-disc clutch/break device 6:

i) In its function as a safety device,
ii) in its function for load compensation for the asynchronous motors 3 and finally
iii) in its function for motor acceleration and slow start-up. This also applies if a common controller 9 is provided for the two driving units I and II and if each driving unit is equipped with its own controller 9.

According to the invention the described driving system can also be used for optionally tensioning the member 1, e.g. the machine haulage chain or the scraper-chain assembly of a conveyor by means for the pressure-controlled multi-disc clutch/break device 6. As known, an initial chain tension adapted exactly to the driving torque of the drive units I,II is required for ideal operation of the conveyor and machine drive. The initial chain tension is generally adjusted or readjusted by shortening the chain in situ. For this purpose it is known to tension the chain on the main or auxiliary drive I,II by control of the driving motor 3. For this purpose, the chain initially has to be caught and locked in the vicinity of this drive unit I,II by means of a chain fixing device, whereupon the coupler 2, i.e the sprocket wheel or drum of the asynchronous motor 3 used as the tensioning motor, is driven slowly while the coupler 2 on the other driving unit II, I is freely movable for chain wrap. The slack chain portion is then eliminated by opening the chain in the region of the chain fixing device, by shortening the chain by removing one or more links and by finally closing the chain again so that, after elimination of the chain fixing device the desired initial chain tension is achieved. This type of chain tensioning operation is generally well known in mining practice. According to the invention the initial chain tension can be adjusted by means of the controller 9 and one of the multi-disc clutch/break device 6. If, for example, the motor 3 on the driving unit I of the main drive is used for chain tensioning the motor 3 of the driving unit I is switched on and the multi-disc clutch/break device 6 on the driving unit II of the auxiliary drive is simultaneously vented under control of the controller 9 after fixing of the chain 1 in the region of the main drive I. After the load-free acceleration of the motor 3 of the drive unit I, the multi-disc clutch/break device 6 thereof is slowly subjected to loading (continuously or in stages) by operating its control valve 7 by the controller 9, so that the contact pressure of this multi-disc clutch/break device 6 is slowly increased. The output torque at the coupler wheel 2 of the drive unit I and accordingly the tension in the chain 1 then increases in proportion with the increasing contact pressure. Once the desired value of the chain tension predetermined in the program of the computer 9 is reached, the chain can be shortened in the conventional manner after mechanical locking of the coupler 2. As mentioned, the chain tension is proportional to the effective power of the motor of the asynchronous motor 3 used as the tensioning motor. During the tensioning process, the effective power of this motor 3 is monitored continuously by the electronic computer of the controller 9. According to a control algorithm predetermined in the computer program, the loading or disc contact pressure of the multi-disc clutch/break device 6 of the drive unit I is increased by the valve 7 with signals by the controller 9 controlled by the computer until the preselected initial chain tension is reached in adaptation to the effective power of the motor 3. The entire tensioning process is therefore automatically computer controlled by the controller 9 via the pressure-adjusting valve 7 acting on the multi-disc clutch/break device 6.

We claim:

1. A drive system for driving a flexible elongate member and comprising:

a coupler around which the elongate member is drivably entrained;

an electric asynchronous motor;

a gearing assembly drivably interposed between the motor and the coupler;

a multi-disc clutch operably associated with the gearing assembly to vary supportive torque exerted on a component of the gearing assembly to control drive torque transmitted through the gearing assembly;

an electrically-actuated valve operably associated with the clutch to provide a variable loading pressure to the discs thereof to control slippage and cause the variation in the supportive torque;

an electronic controller for providing electrical control signals to the valve;

sensor means for sensing operating parameters of the drive system and for providing measurement data to the controller and means within the electronic controller for providing sequential electrical control signals to the valve during starting of the drive system to cause the valve initially to operate the clutch to disconnect the drive through the gearing assembly to allow the motor to accelerate under load-free conditions and thereafter in a start-up phase to cause the valve to operate the clutch to vary progressively the slippage of the discs thereby to and slowly increase the drive torque transmitted through gearing assembly progressively.

2. A drive system according to claim 1, wherein the means for providing sequenced electrical control signals provides signals which operate the valve to vary progressively the slippage in a continuously varying manner.

3. A drive system according to claim 1, wherein the means for providing sequenced electrical control signals provide signals which operate the valve to vary progressively the slippage in an incrementally varying manner.

4. A drive system according to claim 1, wherein the clutch is provided with spring means which, acts on the discs in opposition to the loading pressure and the loading pressure is effected by hydraulic or pneumatic means.

5. A drive system according to claim 1, wherein the sensor means includes means for providing signals to the controller to signify the initial energization of the motor and the termination of the acceleration and the means for providing sequenced electrical control signals responds to said sensor means signals and provides a first signal which closes the valve to permit the clutch discs to open and exert no supportive torque on the component whilst the motor accelerates and thereafter a further signal or signals which actuate the valve to permit the gradual engagement of the clutch discs to exert a progressively increasing supportive torque on the component.

6. A drive system according to claim 1 wherein the gearing assembly includes at least one planetary gearing stage with a ring gear which acts as said component on which supportive torque is exerted.

7. A drive system according to claim 1 wherein the gearing assembly includes at least one planetary gearing stage with a planet wheel carrier which acts as said component on which supportive torque is exerted.

8. A drive system according to claim 1 wherein the gearing assembly comprises a planetary gearing input stage connected to the motor and having said component on which the support torque is exerted and a gearing output stage connected to the input stage and to the coupler.

9. A drive system according to claim 8 wherein the gearing output stage is another planetary gearing stage.

10. A drive system according to claim 8 wherein the gearing output stage is a spur gear stage.

11. A drive system according to claim 8 wherein the planetary gearing input stage has a 1:1 transmission ratio when the clutch is operated to permit a full drive torque to be transmitted.

12. A drive system according to claim 1, wherein the electronic controller employs a computer which processes the measured data by comparing the measurement data with pre-set stored values, evaluates the necessary loading pressure and generates the desired control signals.

13. A drive system according to claim 1, wherein the sensor means provides measurement data including data representing the effective power or current consumption of the motor and the loading pressure.

14. A drive system according to claim 1, and composed of two drive units spaced apart along the elongate member, each drive unit comprising the combination of the coupler, the motor the gearing assembly the clutch and the valve and wherein the gearing assemblies of the two units are controlled by the controller to regulate the clutches and to balance the loading on the units.

15. A drive system according to claim 14, wherein the drive units are controlled by a common controller.

16. A drive system according to claim 14, wherein each drive unit has its own electronic controller.

17. A drive system according to claim 14, wherein the elongate member is a haulage chain for a mineral mining machine or a scraper-chain assembly of a scraper-chain conveyor and the sensor means provides a signal representing the power consumption of the motor of one of the units used in a chain tensioning mode and the electronic controller includes means for providing electrical control signals to the valve of the clutch of said one unit to control the drive torque to bring the tension in the haulage chain or scraper chain assembly to a desired value.

18. A drive system according to claim 1 wherein the sensor means includes means for detecting overloading and the controller includes means for providing a control signal to the valve to operate the clutch and disconnect the drive through the gearing assembly on the detection of a sensed overload.

19. A method of operating a controller of a drive system for driving a haulage chain of a mining machine or a scraper-chain assembly of a conveyor, wherein said drive system includes a pair of spaced apart drive units, each unit comprising a coupler around which the chain or the scraper-chain assembly is drivably entrained;

an electric asynchronous motor;

a gearing assembly drivably interposed between the motor and the coupler;

a multi-disc clutch operably associated with the gearing assembly to vary supportive torque exerted on a component of the gearing assembly to control drive torque transmitted through the gearing assembly; and an electrically-actuated valve operably associated with the clutch to provide a variable loading pressure to the discs thereof to control slippage and cause the variation in the supportive torque;

the drive system further comprising at least one electronic controller for providing electrical control signals to the valves and sensor means for sensing operating parameters of the drive system including overloading and for providing measurement data to the controller; improved method of operating the controller to control the drive torque with the clutches and the valves to ensure a smooth start-up, to balance dynamic loading between the drive units and to disconnect the drive through the gearing assemblies in the event of a sensed overload wherein said method comprises:

providing control signals to the valve during the start-up phase;

operating the clutches to disconnect the drive initially through the associated gearing assemblies;

allowing the motors to accelerate under load free conditions; and thereafter increasing the drive torque transmitted through the gearing assemblies progressively.

20. A method according to claim 19, said method further comprising:

supplying control signals to the valves during the start-up phase;

effecting the progressive increase in drive torque; and causing the valves to increase the loading pressure on the clutches in an incremental fashion.

21. A method according to claim 19, said method further comprising:

supplying control signals to the valves during the start-up phase;

effecting the progressive increase in drive torque; and causing the valves to increase the loading pressure on the clutches in a continuous fashion.

22. A method according to claim 19 wherein the sensor means produces data measurement signals representing the power or current consumption of the motors and the loading pressure on the clutches and the method further comprises comparing the measurement signals with stored values, evaluating the desired loading pressures and causing the control signals to actuate the valves to achieve the desired loading pressures.

23. A method according to claim 19 and further comprising operating one of the units in a chain tensioning mode, producing data measurement signals representing the power or current consumption of the motor of the one unit, comparing the power or current consumption measurement signals with stored values, evaluating the desired loading pressure for the clutch of the motor of the unit to achieve a desired tension and causing the control signals to actuate the valve of the clutch of the one unit to match the desired loading pressure.

* * * * *